3,404,155
METHOD FOR THE PRODUCTION OF UNSATURATED ALIPHATIC ALDEHYDES, UNSATURATED HETEROCYCLIC ALDEHYDES AND AROMATIC ALDEHYDES
Ludwig Hüter, Weisskirchen, Taunus, and Martin Petzold, Bad Homburg vor der Hohe, Germany, assignors to Deutsche Gold- und Silber-Scheideanstalt vormals Roessler, Frankfurt am Main, Germany
Filed Dec. 13, 1965, Ser. No. 513,310
Claims priority, application Germany, Dec. 23, 1964, D 46,124
7 Claims. (Cl. 260—297)

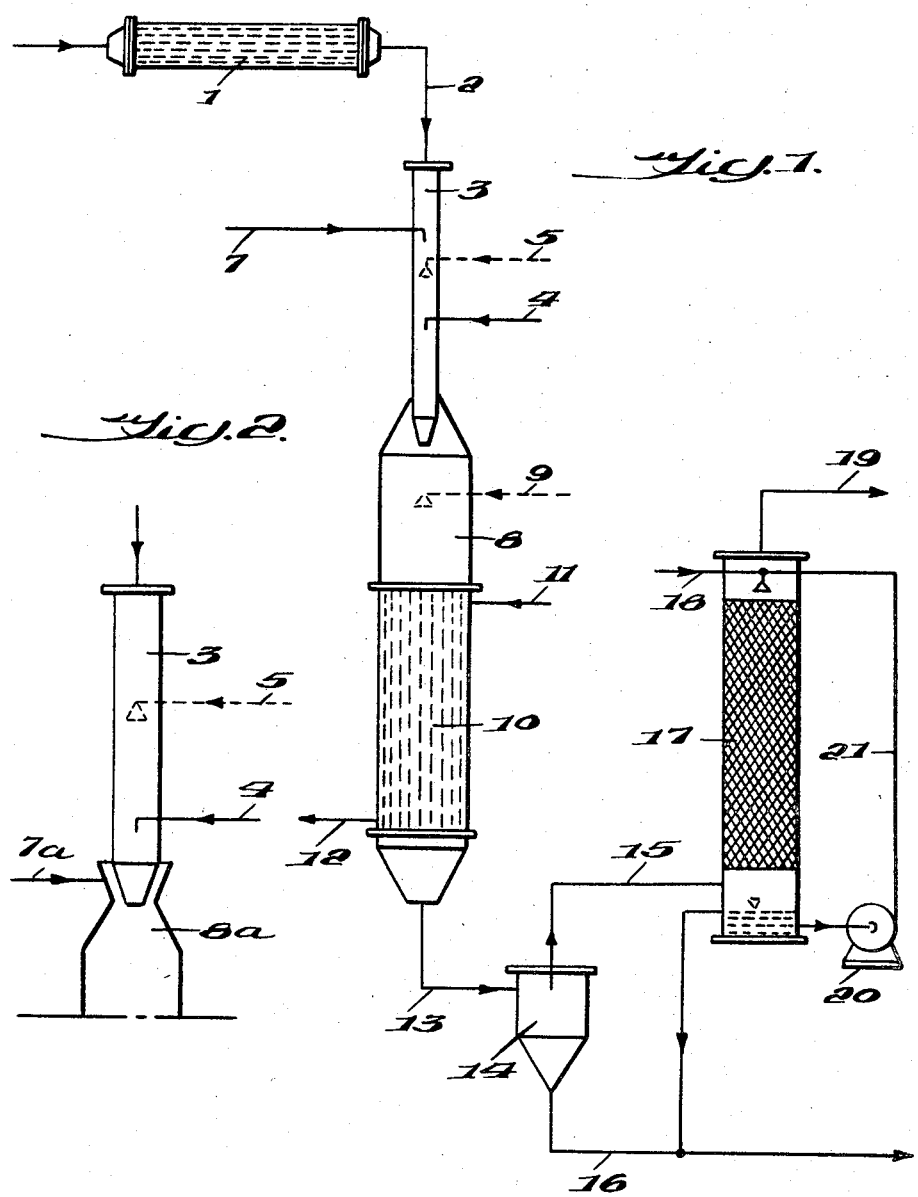

ABSTRACT OF THE DISCLOSURE

Method for the production of an aldehyde selected from the group consisting of unsaturated aliphatic aldehydes, unsaturated heterocyclic aldehydes and aromatic aldehydes which comprises oxidizing a volatile compound having a carbon double bond selected from the group consisting of unsaturated aliphatic hydrocarbons, aromatic hydrocarbons, and unsaturated heterocyclic compounds which except for their cyclic heteroatom content are of hydrocarbon nature, said aliphatic hydrocarbon, aromatic hydrocarbons and heterocyclic compounds carrying at least one methyl group in $\alpha$ position to a carbon double bond, in a homogeneous gas phase reaction in admixture with elemental oxygen and gaseous nitrous acid at a temperature between 200 and 600° C., the quantity of oxygen at most equivalent to the said at least one methyl group in $\alpha$ position to a carbon double bond.

---

The present invention relates to a process for the partial oxidation of hydrocarbons of olefinic, aromatic and unsaturated heterocyclic nature (that is, heterocyclic compounds which except for their heteroatom or atoms are of hydrocarbon nature) with oxygen or gases containing oxygen in a homogeneous gas phase to produce the corresponding aldehydes or dialdehydes.

It is known that olefins, such as, for example, propylene and isobutylene, can be oxidized in a heterogeneous gas phase reaction to unsaturated carbonyl compounds such as acrolein and methacrolein. The catalysts employed therefor are oxides of metals of the first and fourth through eighth groups of the periodic system. For instance, for the production of acrolein from propylene, the copper ($I+II$) oxides have achieved prominence as catalysts, sometimes in conjunction with activators such as selenium or tellurium or as mixed oxides with oxides of other metals such as cobalt, molybdenum, tungsten, iron, bismuth (see Ind. & Eng. Chem. Product Research and Development, vol. 3, No. 2, p. 94).

Insofar as the oxidation of olefinic hydrocarbons in the gas phase without the aid of catalysts has previously been investigated, they were primarily employed for the production of formaldehyde and acetaldehyde in addition to the production of other products, above all of propylene oxide. This type of oxidation proceeds with partial cleavage of the chain of the hydrocarbon used as starting material and it is characterized by the formation of a plurality of oxygen containing reaction products (Chemie-Ing. Technik, No. 1, 1962, p. 53).

According to the invention it was found that unsaturated aliphatic, aromatic or unsaturated heterocyclic aldehydes or, respectively, dialdehydes can be produced by oxidizing the corresponding hydrocarbons in the gas phase with elemental oxygen or elemental oxygen containing gases, if unsaturated aliphatic, aromatic, or unsaturated heterocyclic hydrocarbons containing at least one methyl group in $\alpha$ position wtih reference to their carbon double bond are oxidized in the homogeneous gas phase, at a temperature between about 200 and 600° C., preferably between about 300 and 450° C., with oxygen or oxygen containing gases and either thereafter or simultaneously with nitrous acid or, respectively, its equilibrium mixture which contans nitrous acid, $N_2O_3$ and steam, in such quantities that the oxygen as a maximum is equivalent to the methyl group or groups in $\alpha$ position to the carbon double bond. For sake of simplicity, the term "nitrous acid" is used herein not only to indicate nitrous acid per se but also the above-mentioned equilibrium mixture.

The process according to the invention therefore concerns a directed partial oxidation of hydrocarbons with the aid of oxygen in a homogeneous gas phase.

As already indicated the quantity of oxygen or gases containing the same, such as, air or air the nitrogen component of which has been replaced by steam, should at most be equivalent to the methyl group or groups in $\alpha$ position to the carbon double bond in the starting hydrocarbons. Preferably, however, the quantity of elemental oxygen together with the amount of oxygen supplied in the form of the gaseous nitrous acid provides approximately the exact equivalent. Care therefore should be taken that the oxygen balance with reference to the hydrocarbon supplied is not exceeded by the addition of the nitrous acid as otherwise an overoxidation can occur. On the other hand, a slight excess of hydrocarbon over the quantity of oxygen supplied is not detrimental.

In order to achieve high yields it is expedient to employ about 0.1 to 10 mol percent, preferably about 2 mol percent of nitrous acid with reference to the quantity of elemental oxygen supplied.

According to a preferred embodiment of the process according to the invention a nitrous acid is employed which is obtained by the oxidation of ammonia with oxygen or air and steam with the aid of the usual ammonia oxidation catalysts of noble metals, especially platinum and rhodium and/or of oxides of heavy metals such as iron-, cobalt- or molybdenum oxide, if desired, doped with bismuth oxide.

The hot nitrous acid containing gases may themselves contain an excess of oxygen, but it is also possible to admix additional air or oxygen therewith. Furthermore, they can be added directly to the hydrocarbons to be oxidized whereby such hydrocarbons are heated to some extent. The oxygen can also be supplied to the reaction mixture in such a way that the nitrous acid gases already have had an opportunity to undergo a preliminary reaction with the hydrocarbons. Expediently, the gases themselves should have a threshold temperature of 220 to 280° C. in order that the reaction initiates more easily. This favorable temperature range, which is preferred for initiation of the reaction, can be achieved by corresponding heat exchange between the reaction components.

It, furthermore, is very expedient for the favorable progress of the oxidation in homogeneous gas phase to take care that a thorough mixture is provided both before and during the reaction. For instance, the hot nitrous acid gases can be quenched directly by rapid admixing or injection of slightly preheated hydrocarbons and therefore undergo a prereaction. Advantageously, however, they can also be used to heat the additional oxygen to the favorable starting temperature of 220 to 280° C. with subsequent admixture of the likewise heated hydrocarbons.

Expediently the admixing procedure should be so thorough that the reaction proceeds by itself in a short time of a fraction of a second to several seconds.

A substantial advantage of the process according to the invention resides in the fact that the oxidation reaction itself can be carried out without the aid of a catalyst as this is of value in the removal of heat in a tube reactor and in the use of starting gases of low purity.

The reaction during the partial oxidation is itself very exothermic. Nevertheless when the exothermal reaction becomes difficult to control by indirect cooling, indicating a total combustion, this usually originates from insufficient mixture or quenching of the gases from the ammonia oxidation or a localized excess of free oxygen (also engendered by insufficient mixing).

The process according to the invention can be carried out at normal atmospheric pressure or slightly raised or lowered pressures.

A further advantageous modification of the process according to the invention which leads to a favorable progress of the reaction resides in that the fresh hot reaction gases coming from the ammonia oxidation are mixed together wtih additional steam and pure oxygen or with the hydrocarbon while at velocities higher than the linear velocity of reaction of the gas mixture. The linear velocity of the resulting gas mixture can then be regulated and brought down to the linear reaction velocity by suitable construction of the reaction space in which the oxidation is to proceed, for instance, by widening its cross-section or by the provision of baffle plates so that favorable times of stay for the reaction at optimal temperatures are attained.

In carrying out the process according to the invention it furthermore is of advantage to employ at least 2% to at most 50% of an equivalent of ammonia to be oxidized per $CH_3$ in $\alpha$ position to the carbon double bond in the organic compound to be oxidized to the aldehyde.

Examples of unsaturated aliphatic, aromatic and unsaturated heterocyclic hydrocarbons which can be used as starting materials, for instance, are as follows: propylene, isobutylene, toulene, xylene, $\beta$-picoline and the like. Acrolein, methacrolein, benzaldehyde, pathalic aldehydes and nicotinaldehyde are respectively obtained from such starting compounds.

The advantages of the process according to the invention over those previously employed using heretogeneous catalysis become especially evident if one takes into consideration the high exothermy of the gas reaction involved. As a result of carrying out of the reaction in a homogeneous gas phase better transfer of heat to the surrounding or directly sprayed in cooling medium, for example, water, as well as better temperature control and a noticeable increase in the reactor efficiency at higher throughput are achieved.

The essential difference between the present process and those previously carried out in the homogeneous gas phase resides in the direct and very selective oxidation of the methyl group in $\alpha$ position to the carbon double bond to the aldehyde group which is achieved essentially without cleavage of the hydrocarbon chain and with only slight overoxidation to $CO_2$ and slight formation of by-products so that high yields are obtained with high conversions.

When the proper oxygen-nitrous acid dosages are observed, it is also possible to avoid the type of overoxidation which manifests itself in the formation of peroxides of the corresponding aldehydes. As a consequence in contrast to the previously employed partial oxidation processes, the processing of the product, for example, by distillation is not dangerous.

The following example will serve to illustrate the process according to the invention.

EXAMPLE

A gas mixture consisting of 13 vol. percent of $NH_3$, 19.5 vol. percent of oxygen and the remainder steam was supplied at 150 to 200° C. to an ammonia oxidation furnace in which the oxidation of the $NH_3$ to nitrous acid was effected on heated Pt-Rh nettings at 800–900° C.

6.9 liters per hour calculated under normal conditions of the resulting hot gas stream were taken off directly behind the oxidation zone without, as usually is the case, having the nitrous gases quenched to normal temperature for condensation and absorption for the purpose of $HNO_3$ preparation and 45.8 liters per hour of oxygen (96%) and any desired but premeasured quantity of steam, as well as 100 g. per hour of propylene mixed therewith and the mixture superheated to about 250° C. The thoroughly mixed gases were introduced into a reaction zone and allowed to react therein with each other in a temperature range between 400 and 420° C. during a period of 0.1 to 0.2 second. At the same time some water was sprayed into the reaction space or shortly thereafter to quench the gases and effect condensation.

According to analysis the following were obtained per hour as product:

| Condensate: | G. |
|---|---|
| Acrolein | 90.6 |
| Acrylic acid | 3.2 |
| Acrylonitrile | 1.4 |
| HCN | traces |
| Exhaust gas: | |
| CO and $CO_2$ | 2.5 |
| | 97.7 |

26.7 g. of unreacted propylene passed through the reaction zone. This corresponds to a propylene conversion of 73.3% and a yield of acrolein on the propylene converted of 81%.

In the accompanying drawing:

FIG. 1 diagrammatically shows an apparatus for carrying out the process according to the invention on a technical scale; and FIG. 2 diagrammatically shows a portion of a modified apparatus for carrying out the process according to the invention.

With reference to FIG. 1 of the drawing, a stream of oxygen of technical purity is passed through heat exchanger 1 which heats such oxygen to at least 220° C. Such preheated oxygen is then introduced into mixing chamber 3 over conduit 2. At the same time, a nitrous acid containing gas stream obtained from an ammonia oxidation with oxygen and steam on a Pt-Rh netting catalyst in the quantities indicated above is supplied to the mixing chamber over conduit 4. In addition, a stream of propylene gas is supplied to mixing vessel 3 over conduit 7. All gas streams are supplied at a high velocity in the range of 5 to 100 m./sec. so that a thorough mixture is effected in the mixing chamber and that at the same time premature spontaneous ignition is prevented. If needed, additional steam may be supplied over conduit 5.

The reaction which begins immediately is maintained within the desired temperature range in the reaction space 8 of widened cross-section by spraying in water over conduit 9. After the reaction, the reaction mixture is rapidly cooled down by passage through heat exchanger 10, cooled with water, supplied over conduit 11 and withdrawn through conduit 12, and supplied over conduit 13 to separator 14 from which the condensate is withdrawn through conduit 16.

The noncondensed gases, such as, nitrogen, CO and $CO_2$ are supplied to a gas scrubber 17 over conduit 15. The gas scrubber 17 is supplied over conduit 18 with scrubbing water which also can be recycled with the aid of pump 20 and conduit 21. The scrubbed exhaust gases are withdrawn over conduit 19.

If desired, the stream of propylene gas need not be supplied to the mixing chamber 3 as described above so that it is mixed simultaneously with the oxygen and nitrous acid containing gases supplied thereto, but rather is supplied as shown in FIG. 2 after the oxygen and nitrous acid containing gases are premixed in mixing chamber 3. In this instance, the propylene containing gas stream is supplied tangentially through conduit 7a so that it is thoroughly mixed with the oxygen and nitrous acid gas mixture as it leaves mixing chamber 3 and enters the widened reaction space 8a which corresponds to reaction space 8 of FIG. 1. Preferably, the propylene containing gas stream is preheated to at least 250° C. before it is introduced through conduit 7a and mixed with the gas mixture leaving mixing chamber 3.

We claim:
1. A method for the production of an aldehyde selected from the group consisting of acrolein, methacrolein, benzaldehyde, phthalic aldehydes and nicotinaldehyde which comprises oxidizing a volatile compound having a carbon double bond and carrying at least one methyl group in α position to a carbon double bond selected from the group consisting of propylene, isobutylene, toluene, xylene and β-picoline in a homogeneous gas phase reaction in admixture with elemental oxygen and gaseous nitrous acid at a temperature between 200 and 600° C., the quantity of oxygen at most equivalent to the said at least one methyl group in α position to a carbon double bond.

2. The process of claim 1 in which such oxidation is carried out at a temperature between 300 and 450° C.

3. The process of claim 1 in which the quantity of nitrous acid is about 0.1 to 10 mol percent with reference to the elemental oxygen.

4. The process of claim 1 in which the quantity of elemental oxygen employed is less than that equivalent to the said at least one methyl group in α position to a carbon double bond and the quantity of nitrous acid employed is such that oxygen supplied thereby together with the elemental oxygen is about equivalent to the said at least one methyl group in α position to a carbon double bond.

5. The process of claim 4 in which the quantity of nitrous acid is about 0.1 to 10 mol percent with reference to the elemental oxygen.

6. The process of claim 1 in which the gaseous nitrous acid employed is supplied directly from a catalytic ammonia oxidation with oxygen in the presence of steam.

7. The process of claim 5 in which the gaseous nitrous acid is obtained by the oxidation of about 2 to 50% of an amount of ammonia equivalent to each methyl in α position to the carbon double bond in the compound to be oxidized.

References Cited
UNITED STATES PATENTS

| | | | |
|---|---|---|---|
| 2,190,453 | 10/1936 | King et al. | 260—604 |
| 3,102,147 | 9/1963 | Johnson | 260—604 |
| 1,985,975 | 12/1934 | Harter | 260—604 |

HENRY R. JILES, *Primary Examiner.*

AL ROTMAN, *Assistant Examiner.*